United States Patent
Nejezchleb et al.

(10) Patent No.: US 6,962,304 B2
(45) Date of Patent: Nov. 8, 2005

(54) SINGLE REEL TAPE CARTRIDGE WITH TAPE REEL CENTERING FEATURES

(75) Inventors: Henrik Vladimir Nejezchleb, Boulder, CO (US); Vladimir Nejezchleb, Boulder, CO (US); James Zweighaft, Boulder, CO (US)

(73) Assignee: Quantum Corporation, San Jose, CA (US)

( * ) Notice: Subject to any disclaimer, the term of this patent is extended or adjusted under 35 U.S.C. 154(b) by 285 days.

(21) Appl. No.: 10/313,507

(22) Filed: Dec. 6, 2002

(65) Prior Publication Data

US 2004/0256510 A1 Dec. 23, 2004

Related U.S. Application Data

(63) Continuation-in-part of application No. 09/885,899, filed on Jun. 20, 2002, now abandoned.

(51) Int. Cl.[7] ............................................. G03B 23/02
(52) U.S. Cl. ..................... 242/343.2; 242/348; 360/132
(58) Field of Search .......................... 242/338.1, 338.2, 242/338.3, 343, 343.2, 348, 348.2, 422.4; 360/132

(56) References Cited

U.S. PATENT DOCUMENTS

| | | | |
|---|---|---|---|
| 4,775,115 A | 10/1988 | Gelardi | |
| 5,027,249 A | 6/1991 | Johnson et al. | |
| 5,323,984 A | 6/1994 | Lackowski | |
| 5,826,811 A | 10/1998 | Melbye et al. | |
| 5,868,338 A | 2/1999 | Martin et al. | |
| 6,034,850 A | 3/2000 | Del Genio et al. | |
| 6,043,963 A | 3/2000 | Eaton | |
| 6,264,126 B1 | 7/2001 | Shima et al. | |
| 6,315,230 B1 | 11/2001 | Hansen et al. | |
| 2004/0007637 A1 * | 1/2004 | Nejezchleb et al. | 242/348 |
| 2004/0089756 A1 * | 5/2004 | Sanpei et al. | 242/348 |

FOREIGN PATENT DOCUMENTS

| | | |
|---|---|---|
| DE | 10045032 | 5/2001 |
| EP | 0926676 A1 | 6/1999 |
| EP | 1087396 A1 | 3/2001 |
| EP | 1098321 A1 | 5/2001 |

* cited by examiner

Primary Examiner—William A. Rivera
(74) Attorney, Agent, or Firm—Morrison & Foerster LLP

(57) ABSTRACT

The single reel tape cartridge with tape reel centering features provides one or more features to center the tape reel with respect to the interior surfaces of the tape cartridge housing and a rotatably driven feature, such as a drive chuck, in the tape drive that rotates the tape reel. The single reel tape cartridge with tape reel centering features provides mechanical positioning and centering of the tape reel with respect to the drive chuck of the tape drive when the tape cartridge is in any orientation and constrains lateral movement of the tape reel to prevent the tape reel from contacting the interior surfaces of the tape cartridge housing. This is accomplished by the use of a spring that applies a bias force to press the tape reel against the drive chuck in the tape drive, which rotates the tape reel. One end of the spring is seated in a spring sleeve that is formed in the center of the interior surface of the top section of the tape cartridge housing. The other end of the spring engages the tape reel.

5 Claims, 3 Drawing Sheets

SINGLE REEL TAPE CARTRIDGE WITH TAPE REEL CENTERING FEATURES

CROSS-REFERENCE TO RELATED APPLICATIONS

This application is a continuation-in-part of U.S. patent application Ser. No. 09/885,899 filed Jun. 20, 2001 now abandoned and titled "Single Reel Tape Cartridge With Tape Reel Centering Features".

FIELD OF THE INVENTION

The invention relates to single reel tape cartridges that are used in tape drive storage devices, and in particular, to a single reel tape cartridge having tape reel centering features.

PROBLEM

It is a problem in the field of single reel tape cartridges that are used in tape drive storage devices to facilitate the positioning and centering of the tape reel, located within the tape cartridge, with respect to the drive chuck of the tape drive. The tape drive chuck rotates to impart rotational motion to the tape reel by the use of features on the tape drive chuck (teeth, spline, pins, etc.) that mate with corresponding features on the hub of the tape reel. The rotation of the tape reel causes movement of the magnetic tape wound on the tape reel to or from the take-up reel that is located within the tape drive. Accurate positioning and centering of the tape reel within the tape cartridge and with respect to the tape drive chuck is desirable to ensure effective engagement between the hub of the tape reel and the tape drive chuck.

The single reel tape cartridge disclosed by Johnson et al. (U.S. Pat. No. 5,027,249) includes a single ball bearing and an annular groove on the closed end of the tape reel hub in mated alignment with the annular ridge around the circular opening in the bottom of the tape cartridge. When the tape cartridge is not engaged with the drive mechanism, the annular groove and the annular ridge are engaged to prevent movement of the tape reel. When the drive mechanism is engaged with the tape cartridge, the drive mechanism applies an upward force on the tape reel whereby the annular ridge is no longer in engagement with the annular groove. Thus, the only support for the tape reel during operation is axial, through the drive member of the drive mechanism and through the bearing.

The bearing assembly includes a spring, a single ball bearing, a bearing disc and an elongated bearing support which extends through the spring. The elongated support is adapted at one end to receive the ball bearing. The spring provides the necessary tension to maintain contact between the ball bearing and the recess of the bearing disc and keeps the platter portion of the reel spaced apart from the top side of the tape cartridge. The spring applies a force on the bearing assembly to prevent the reel from "wobbling" during rotation. Johnson further includes a bearing support which extends through the center of the spring into the center of the ring wall. One end of the spring is located on the outside of the ring wall. Thus, the bearing support further prevents the spring from deflecting, however, that does not resolve the centering problem when the tape cartridge is not engaged and when the tape cartridge is vertically oriented.

Another prior art tape cartridge is illustrated in FIG. 1 of the Eaton patent (U.S. Pat. No. 6,043,963). Eaton includes multiple bearings and a clutch and brake at the bottom of the tape cartridge which functions like the annular groove and annular ridge of the Johnson patent. When the tape reel is engaged with the tape drive mechanism, the tape reel is pushed upward which disengages the brake, allowing the reel to rotate about the axis on the bearings. However, the height of the prior art tape cartridge of Johnson and tape cartridge illustrated in FIG. 1 of Eaton is typically twice as thick as the width of the tape they contain.

The height problem is solved by the low profile tape cartridge disclosed in Eaton, FIGS. 2–9, wherein the brake and bearing assemblies are replaced with a side brake mechanism. The Eaton tape cartridge includes drive teeth located at the bottom of the tape cartridge hub for engaging with the drive mechanism and at least one side brake. A typical low profile tape cartridge includes two side brakes which apply an upward force on one flange of the tape reel and a downward force on the opposing flange. By applying opposing forces on the tape cartridge reel flanges, the reel is prevented from moving in a direction other than coaxial with the hub axis. However, when one or more of the side brakes are released, the tape reel shifts position, becoming misaligned with the drive aperture.

This tape reel centering problem is exacerbated when the tape cartridge is oriented on its side. (i.e. gravitational force perpendicular to the tape reel axis). Existing tape cartridges were designed to function in a flat orientation (gravity parallel to tape reel axis). When these existing tape cartridges are used in a vertical orientation, they experience failures due to the fact that they were not designed for this type of function and the tape reel is not properly located within the tape cartridge housing. Tape cartridge libraries, automatic tape cartridge loading devices, and robotic tape cartridge handling apparatus frequently orient the tape drives vertically (on their sides) and encounter failures of the tape reel drive feature to engage with the mating drive feature located on the drive chuck of the tape drive.

During operation, the vertically oriented tape cartridge is drawn into the tape drive. As the tape cartridge is drawn further into the tape drive, a mechanism within the tape drive releases the brake, which is holding the tape reel in place to prevent unwinding of the tape media. When the brake is released while the tape cartridge is vertically oriented, gravity causes the tape reel to drop, becoming misaligned with the drive chuck access hole located in the bottom of the tape cartridge. Since the tape reel is not properly aligned with the tape drive mechanism, the engaging features impact each other for a period of time rather than engaging each other to rotate the tape reel. Therefore, the Eaton low profile tape cartridge experiences failures due to the tape reel not being properly aligned within the tape cartridge.

Existing low profile single reel tape cartridges fail to provide a high degree of accuracy in aligning the tape reel with the drive chuck, often resulting in the engaging features impacting each other for a period of time rather than engaging each other to rotate the tape reel. In addition, a further aspect to the tape reel centering problem is that unconstrained lateral movement of the tape reel within the tape cartridge housing often results in damage to the tape reel if the tape cartridge is dropped and the tape reel impacts the interior surface of the tape cartridge housing.

For these reasons, a need exists for a tape cartridge having a tape reel centering feature for preventing the shifting of the tape reel that would otherwise occur when the tape cartridge brake is released.

SOLUTION

The present single reel tape cartridge with tape reel centering features overcomes the problems outlined above and advances the art by providing a magnetic tape reel that is equipped with one or more features to center the tape reel with respect to the interior surfaces of the tape cartridge housing and by providing a rotatably driven feature, such as a drive chuck, in the tape drive that rotates the tape reel. The single reel tape cartridge with tape reel centering features provides mechanical positioning and centering of the tape reel with respect to the drive chuck of the tape drive when the tape cartridge is in any orientation and constrains lateral movement of the tape reel to prevent the tape reel from contacting the interior surfaces of the tape cartridge housing.

This is accomplished by the use of a spring that applies a bias force to press the tape reel against the drive chuck in the tape drive, which rotates the tape reel. One end of the spring is seated in a spring sleeve that is formed in the center of the interior surface of the top section of the tape cartridge housing. The other end of the spring engages the tape reel. Centering of the tape reel within the tape cartridge housing and with respect to the drive chuck is also achieved with by use of a tape reel hub-centering feature. This tape reel hub-centering feature consists of a chamfered centering ring that encircles the drive teeth formed on the tape reel to engage the drive chuck. The chamfered centering ring fits into a chamfer that is formed in the circumference of the drive chuck access hole located in the bottom of the tape cartridge housing. A cylindrically shaped tape reel locator boss is also formed in the center of the inside of the top section of the tape cartridge housing. The tape reel locator boss mates with the tape reel center bore formed in the tape reel hub. The tape reel locator boss can include a chamfer formed on its rim to enable smooth engagement of the tape reel locator boss with the mating tape reel center bore. In addition, a plurality of ramped centering posts can be used in the tape cartridge housing to form a channel by which the drive teeth formed on the tape reel are guided into alignment with the drive chuck. In operation, the ramped centering posts serve to funnel the tape reel into a substantially centered position within the tape cartridge housing so that the drive teeth of the tape reel are centered with respect to the drive chuck access hole.

DETAILED DESCRIPTION OF THE DRAWINGS

For purposes of illustration and not of limitation, various features and advantages of the present invention will now be described within the context of a single reel DLT tape cartridge. It is to be understood that the following description with respect to a DLT tape cartridge is not intended to limit the scope of the present invention. It would be obvious to one skilled in the art that the principles of the present invention could be easily applied to other tape cartridge formats.

Figure 1:
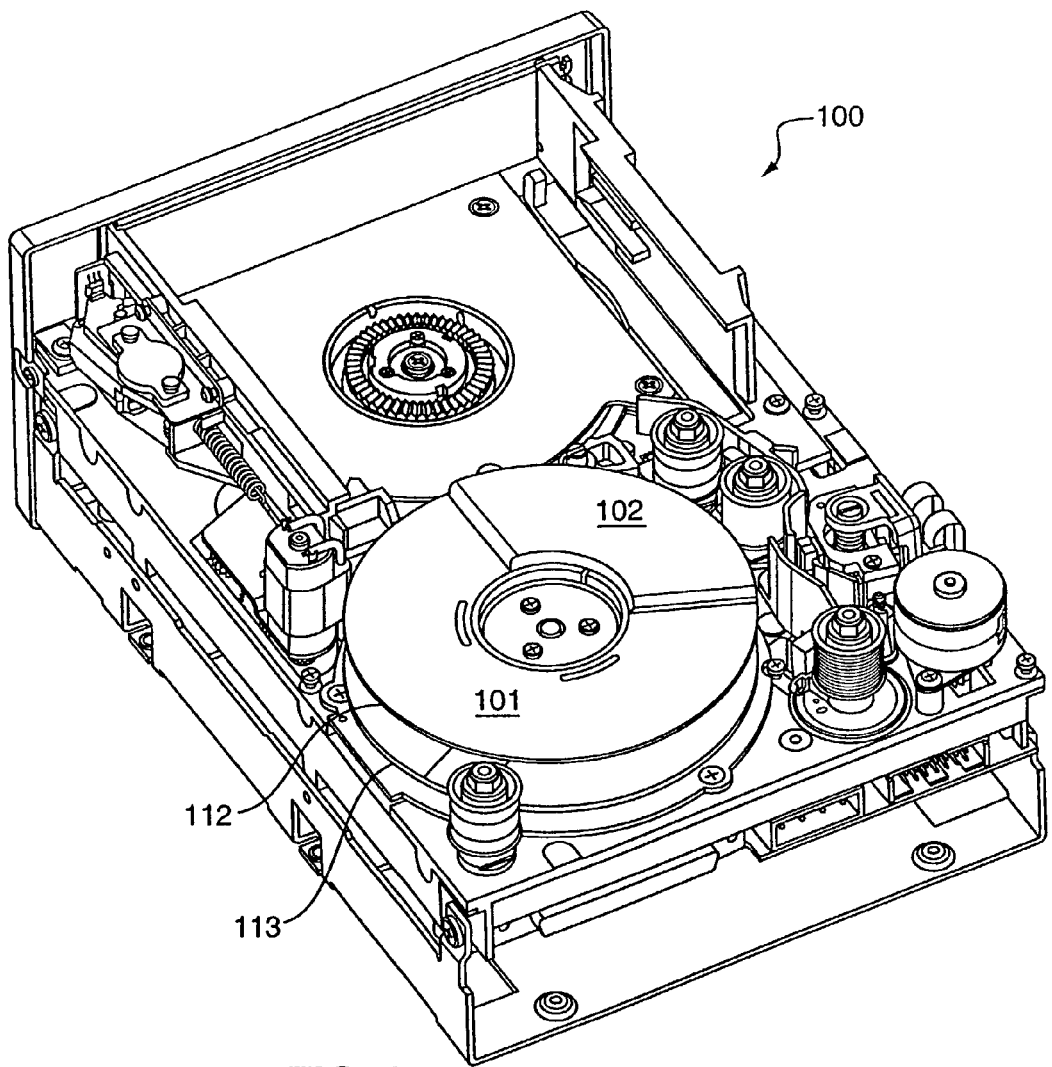
FIG. 1 illustrates a typical tape drive that is adapted to load single reel tape cartridges for the reading and writing of data on rewriteable media stored in the single reel tape cartridges.
Figure 2:
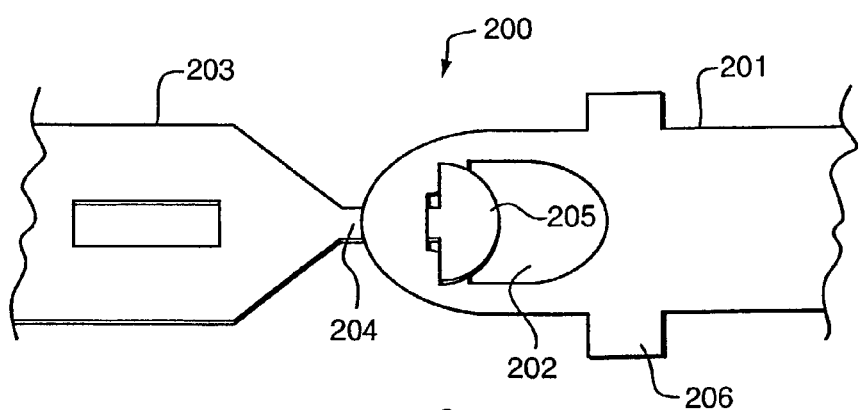
FIG. 2 illustrates a typical single reel tape cartridge and the interconnection of the rewriteable media stored therein with a leader attached to the take-up reel of the tape drive.

FIG. 1 illustrates one example of a typical tape drive 100. The tape drive 100 is a DLT tape drive that employs a single reel DLT tape cartridge. This design includes a supply reel located within a tape cartridge (not shown) and a take-up reel 101 located within the tape drive 100. Referring to FIG. 2, the magnetic tape media in the tape cartridge is terminated at one end by a tape cartridge leader 201. The tape cartridge leader 201 is a strong flexible plastic strip containing an ovular aperture 202 on its distal end. A take-up leader 203, that connects to the take-up reel 101, is a similar plastic strip that includes a stem 204 and tab 205 designed to buckle with the ovular aperture 202 on the tape cartridge leader 201 to form buckle 200. The tape cartridge leader 201 also includes a section 206 that is slightly wider than the rest of the tape cartridge leader 201 and the take-up leader 203. The wider section 206 prevents the tape cartridge leader 201 from being pulled into the tape cartridge after the tape cartridge leader 201 and take-up leader 203 are disconnected for ejection of the tape cartridge.

Upon loading the tape cartridge into the tape drive 100, the take-up leader 203 and tape cartridge leader 201 are buckled, and the tape media is wound to a start point or read position in the tape drive. To accommodate the slightly wider section 206 during winding of the tape cartridge leader 201 and the take-up leader 203 around the take-up reel 101, the take-up reel 101 includes a wider stepped area 102 formed in the top and in the bottom flanges, 112 and 113, of the take-up reel 101.

Figure 4:
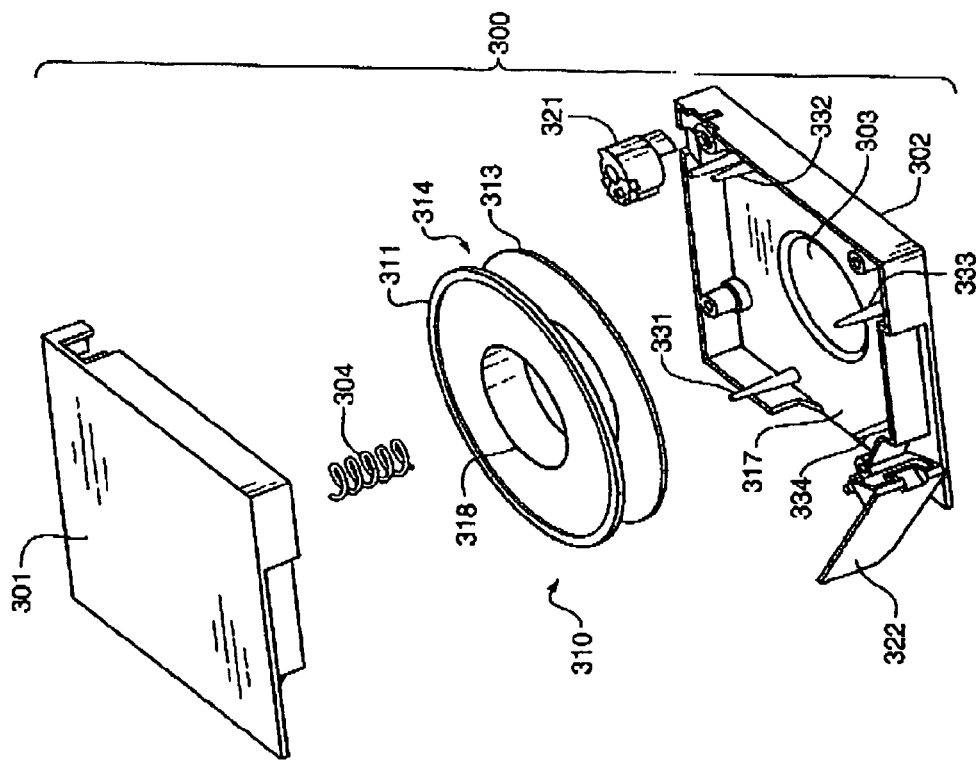
FIGS. 3 and 4 illustrate in bottom and top perspective views, respectively, an exploded representation of the single reel tape cartridge with tape reel centering features.
Figure 3:
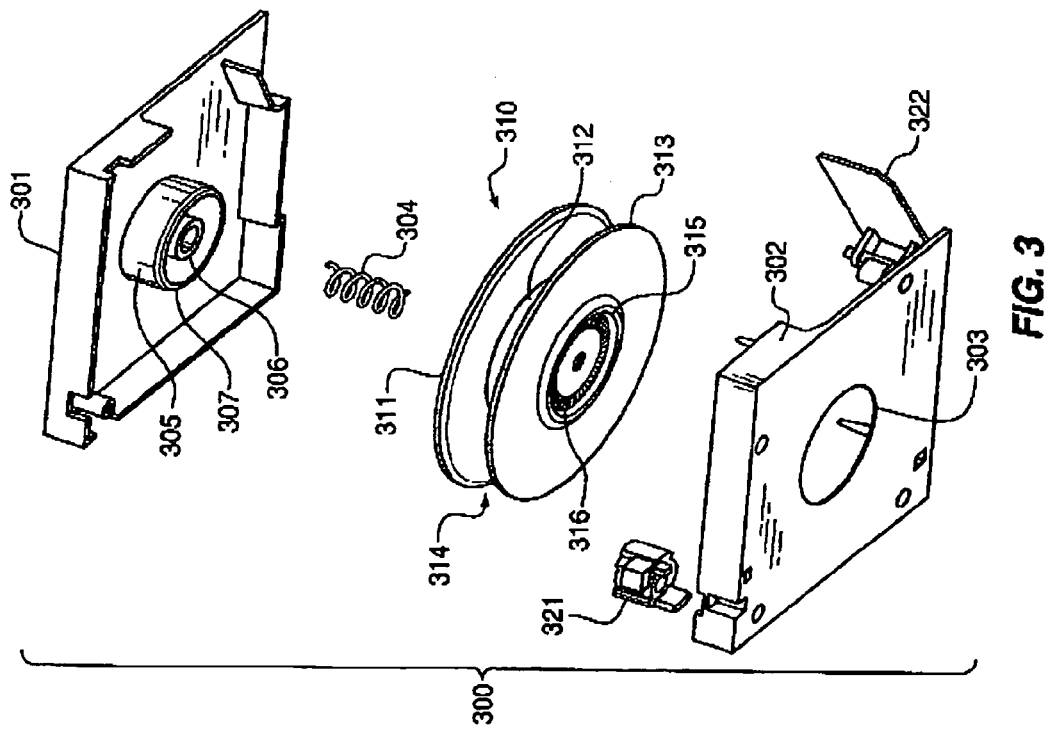

FIGS. 3 and 4 illustrate in bottom and top perspective views, respectively, an exploded representation of the single reel tape cartridge with tape reel centering features. To clearly illustrate the tape reel centering features, the tape cartridge side brakes are not illustrated in FIGS. 3 and 4. The tape cartridge 300 consists of a two-part housing that includes a top section 301 and a bottom section 302 for enclosing the tape reel 310 and its associated magnetic tape (not shown). The tape reel 310 comprises a top flange 311 connected to a top portion of a tape reel hub 312 and a bottom flange 313 connected to a bottom portion of the tape reel hub 312. The tape reel hub 312 could be a conventional tape reel hub that connects to the tape drive in a conventional manner. The top and bottom flanges, 311 and 313, are connected in a parallel relationship and form a magnetic tape media containment section 314 on the tape reel hub 312. The tape media containment section 314 guides the tape media around the tape reel hub 312 during operation of the tape drive. The tape cartridge 300 also includes a write protect element 321 and magnetic tape access door 322.

Figure 5:
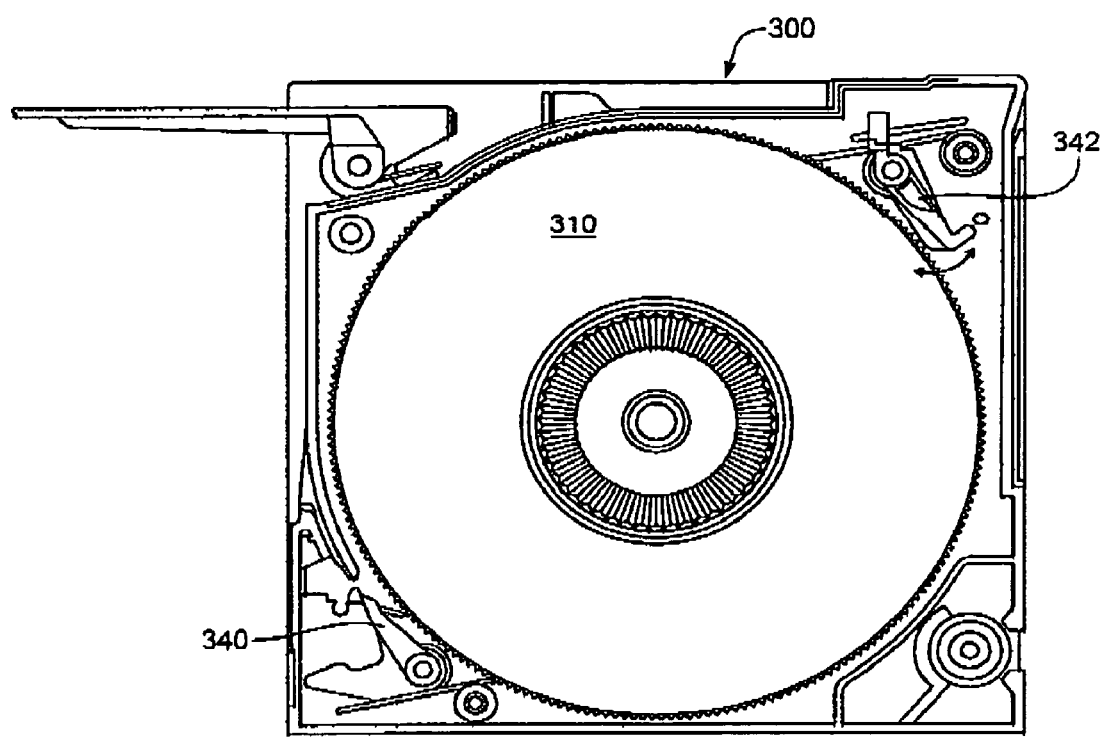
FIG. 5 illustrates a top view illustrating the side brakes of the present single reel tape cartridge with tape reel centering features.

FIG. 5 illustrates a top view of the side brakes embodied in a typical low profile tape cartridge. A typical low profile tape cartridge 300 having two side brakes, 340 and 342, on opposing sides of tape cartridge 310 apply an upward force on one flange of the tape reel and a downward force on the opposing flange. By applying opposing forces on tape reel flanges 311 and 313, the tape reel 310 is preventing from moving in directions other than coaxial with the hub axis. However, when one of more of the side brakes, 340 and 342, is released, the tape reel 310 may shift, moving in a direction that is perpendicular to the hub, axis, thereby misaligning the tape reel 310l within the tape cartridge housing.

Tape cartridges may be oriented vertically on their side, especially when used with a tape library. Prior art tape cartridges were designed to function in a flat orientation (gravity parallel to the tape reel axis). During operation, the vertically oriented tape cartridge 300 is drawn into the tape drive 100. As the tape cartridge 300 is drawn further into the tape drive 100, a mechanism within the tape drive 100 releases the brakes 340 and 342 which are holding the tape reel 310 in place to prevent movement of the tape reel 310 and unwinding of the tape media. When the brakes, 340 and 342, are released while the tape cartridge 300 is vertically oriented, gravity causes the tape reel 310 to drop, becoming misaligned with the drive chuck access hole 303 located at the bottom of the tape cartridge 300. Since the tape reel 310 is not properly aligned with the tape drive mechanism, the engaging features impact each other for a period of time rather than engaging each other to rotate the tape reel 310.

It is desirable to have the tape reel 310 centered with respect to the drive feature to enable the drive teeth on the drive chuck on the tape drive to accurately and securely engage the drive teeth 315 on the tape reel 310. A drive chuck access hole 303 is formed in the bottom section 302 of the tape cartridge housing to enable the drive chuck of the tape drive to engage the drive teeth 315 of the tape reel 310. A spring 304 applies a bias force to press the tape reel 310 against the drive feature (such as the drive chuck) in the tape drive when engaged to rotate the tape reel 310. In order to provide a bias force on the tape reel 310 in a manner to automatically center the tape reel 310 on the drive teeth 315, one end of the spring 304 is seated in a spring sleeve 306 that is formed in the center of the interior surface of the top section 301 of the tape cartridge housing. The other end of the spring 304 engages the tape reel 310. The use of the spring sleeve 306 reduces spring deflection in directions other than coaxial with the axis of the tape reel 310, thereby also reducing any lateral forces on the tape reel 310. This reduction of lateral forces serves to automatically center the tape reel 310 on the drive teeth 315.

Centering of the tape reel 310 within the tape cartridge housing and with respect to the drive chuck is also achieved with by use of a tape reel hub-centering feature. This tape reel hub-centering feature consists of a chamfered centering ring 316 that encircles the drive teeth 315 formed on the tape reel 310 to engage the drive chuck. The chamfered centering ring 316 fits into a chamfer 317 that is formed in the circumference of the drive chuck access hole 303 located in the bottom of the tape cartridge housing. The chamfered centering ring 316 seats in the chamfer 317 of the drive chuck access hole 303 to precisely align the drive teeth 315 formed on the tape reel 310 with the drive chuck.

The tape cartridge 300 is resistant to damage that can be caused by dropping the tape cartridge. The tape cartridge 300 is equipped with a cylindrically-shaped tape reel locator boss 305 that is formed in the center of the inside of the top section 301 of the tape cartridge housing. The tape reel locator boss 305 mates with the tape reel center bore 318 formed in the tape reel hub 312 and extends a substantial distance into the tape reel centering bore to prevent movement of the tape reel perpendicular to the hub axis when the tape cartridge is vertically oriented of oriented upside down. In particular, the tape reel center bore 318 is a cylindrically shaped opening of diameter greater than the diameter of the tape reel locator boss 305. The dimensions of the tape reel center bore 318 and tape reel locator boss 305 are selected to prevent lateral movement of the tape reel 310 where the flanges 311, 313 can impact the walls of the housing. The tape reel locator boss 305 can include a chamfer 307 formed on its rim to enable smooth engagement of the tape reel locator boss 305 with the mating tape reel center bore 318.

When the tape cartridge 300 is dropped, the tape reel locator boss 305 prevents the tape reel flanges 311, 313 from impacting the interior side walls of the cartridge housing 301, 302 because the tape reel locator boss 305 is located within the tape reel center bore 318 which limits the travel of the tape reel side to side within the cartridge housing. In addition, a ring or ridge of raised material could be added to the inside top and/or wall of the cartridge housing which prevents the tape reel flange(s) from impacting the inside of the cartridge housing due to motion along the axis of the tape reel 310.

When the tape cartridge is vertically oriented, the tape reel locator boss 305 prevents movement of the tape reel 310 due to increased weight on the tape reel 310 when the brakes 340 and 342 are released. At the same time, spring 304 applies a bias force on the tape reel hub to press the tape reel 310 against the drive feature in the tape drive 100 when engaged to rotate the tape reel 310. Furthermore, the spring sleeve 306 enclosing one end of spring 304 allows spring 304 provide a bias force on the tape reel 310 in a manner to automatically center the tape reel 310 on the drive teeth 315 when the brakes, 340 and 342, are released.

In addition, a plurality of ramped centering posts 331–334 can be used in the tape cartridge housing to form a channel by which the drive teeth 315 formed on the tape reel 310 are guided into alignment with the drive chuck. In operation, the ramped centering posts 331–334 serve to funnel the tape reel 310 into a substantially centered position within the tape cartridge housing so that the drive teeth 315 of the tape reel 310 are centered with respect to the drive chuck access hole 303. In addition, when the tape cartridge is inserted in the tape drive, the axes of the bias spring 304, tape reel 310, and drive chuck are largely collinear. On occasion, however, the axis of the drive chuck and tape reel 310 are not collinear. This inhibits the proper engagement of the drive teeth located on the drive chuck with the drive teeth 315 on the tape reel 310. The outside diameter of the drive chuck teeth is less than the inside diameter of the chamfered centering ring 316 by a specific amount. If the inside face of the chamfered centering ring 316 comes into contact with the outside diameter of the drive chuck teeth thus providing a side-wards force is applied to the tape reel 310 to automatically center it. Due to the angle and orientation of the chamfered centering ring 316, the tape reel 310 is biased to move into a position where the axes of the tape reel 310 and drive chuck are collinear. When these axes are collinear, the respective drive teeth of the drive chuck and tape reel are aligned, and have the best opportunity for full and secure engagement.

Additionally, if, due to some other forces, the respective drive teeth of the drive chuck and tape reel were to become disengaged, the chamfered centering ring 316 would aid in the re-engagement of the respective drive teeth of the drive chuck and tape reel since the chamfered centering ring 316 would provide a physical and mechanical barrier against the axes of the tape reel 310 and drive chuck becoming substantially non-collinear.

ALTERNATE EMBODIMENTS

The respective and mating drive teeth of the drive chuck and tape reel could alternatively be implemented as other mating features such as, but not limited to, pin and hole configurations, matching spline tongue and groove configurations, or any other mating features that would facilitate transmitting a rotational force from a drive feature to a driven feature.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A single reel tape cartridge that is configured to be loadable into a tape drive to read and write data on rewriteable media that is wound on the single reel tape cartridge, the single reel tape cartridge comprising:
 a tape reel comprising:
  a hub having a tape reel center bore formed axially therein,
  a first flange connected to a top of the hub,
  a second flange connected to a bottom of the hub in a parallel relationship with the first flange, wherein the first flange and the second flange define a tape containment section between said first and second flanges, and
  connecting means, attached to said bottom of said hub, to cause rotation of said tape reel;
 spring for applying a bias force on said connecting means of said tape;
 a braking means to stop a rotational movement of said tape reel by applying a force on at least one of said first flange and said second flange, said braking means located on a side of said tape cartridge to allow said braking means to engage with said tape reel; and
 a housing for enclosing said tape reel comprising:
  a tape reel locator boss formed on an interior surface of said housing and mates with said tape reel center bore, wherein the dimensions of said tape reel center bore and said tape reel locator boss are selected to prevent lateral movement of said tape reel;
  a spring sleeve coaxially formed within said tape reel locator boss for enclosing one end of said spring to reduce spring deflection in directions other than coaxial with an axis of said tape reel to reduce lateral forces on said tape reel; and
  a plurality of ramped centering posts formed on an inside surface of said housing to form a channel to funnel said tape reel into a substantially centered position within the tape cartridge housing.

2. The single reel tape cartridge of claim 1 wherein said spring centering means limits movement of said spring means in directions that are perpendicular to said hub axis.

3. The single reel tape cartridge of claim 1 wherein said tape reel locator boss further comprises:
 a chamfer formed on a circumference of said tape reel locator boss for guiding said tape reel locator boss into said tape reel center bore.

4. A single reel tape cartridge that is configured to be loadable into a tape drive to read and write data on rewriteable media that is wound on the single reel tape cartridge, the single reel tape cartridge comprising:
 a tape reel comprising:
  a cylindrically shaped hub having a cylindrically shaped center bore formed axially therein,
  a first flange connected to a top of the hub,
  a second flange connected to a bottom of the hub in a parallel relationship with the first flange, wherein the first flange and the second flange define a tape containment section between the first and second flanges,
  drive teeth located on said bottom of said hub to cause rotation of said tape reel; and
  a chamfered center ring that encircles said drive teeth formed on said bottom of said hub;
 bias spring, having a body, a first end and a second end, for applying a bias force via said first end on said hub;
 a brake located along a side of said tape cartridge for applying a force on said tape reel to stop a rotational movement of said tape reel when engaged; and
 a housing for enclosing said tape reel, comprising:
  a bottom section having a chamfered aperture toned therein for mating with said chamfered center ring on said bottom of said hub, wherein said bias spring applies a bias on said chamfered center ring of said hub to prevent lateral movement of said tape reel within said single reel tape cartridge; and
  a top section comprising:
   a tape reel locator boss having a chamfered circumference formed on an interior surface of said top section and aligned to mate with said cylindrically shaped hub to prevent lateral movement of said tape reel within said single reel tape cartridge; and
   a spring centering sleeve formed on said interior surface of said top section and aligned to receive said body and said second end of said bias spring to reduce spring deflection in directions other than coaxial with an axis of said cylindrically-shaped hub, wherein said bias spring applies a bias on said tape reel to maintain contact between said chamfered center ring and said chamfered aperture to further prevent lateral movement of said tape reel within said tape cartridge.

5. The single reel tape cartridge of claim 4 wherein said spring centering sleeve limits movement of said body of said bias spring in directions that are perpendicular to said hub axis.

* * * * *